US006933484B2

(12) United States Patent
Lindley et al.

(10) Patent No.: US 6,933,484 B2
(45) Date of Patent: Aug. 23, 2005

(54) MICROWAVE OVEN WITH FOOD STIRRING DEVICE

(76) Inventors: Jeffrey A. Lindley, 827 Schumanns Beach Rd., New Braunfels, TX (US) 78130; Martha C. Lindley, 827 Schumanns Beach Rd., New Braunfels, TX (US) 78130

( * ) Notice: Subject to any disclaimer, the term of this patent is extended or adjusted under 35 U.S.C. 154(b) by 0 days.

(21) Appl. No.: 10/792,002

(22) Filed: Mar. 3, 2004

(65) Prior Publication Data

US 2004/0173606 A1 Sep. 9, 2004

Related U.S. Application Data

(60) Provisional application No. 60/452,195, filed on Mar. 5, 2003.

(51) Int. Cl.[7] ............................ H05B 6/80; A47J 43/07

(52) U.S. Cl. ...................... 219/726; 219/754; 219/762; 99/348; 99/DIG. 14; 366/146

(58) Field of Search ................................ 219/726, 725, 219/754, 762, 763; 99/348, 451, DIG. 14; 366/146, 228, 231

(56) References Cited

U.S. PATENT DOCUMENTS

| | | | | | |
|---|---|---|---|---|---|
| 2,203,672 | A | * | 6/1940 | Chester | 366/251 |
| 4,832,501 | A | * | 5/1989 | McCauley | 366/279 |
| 4,904,834 | A | * | 2/1990 | Bowen | 219/726 |
| 4,952,069 | A | | 8/1990 | Boulard | |
| 4,980,529 | A | * | 12/1990 | Bolton | 219/752 |
| 5,021,621 | A | | 6/1991 | Demmer et al. | |
| 5,286,107 | A | * | 2/1994 | Artusi | 366/343 |

FOREIGN PATENT DOCUMENTS

| | | | | |
|---|---|---|---|---|
| GB | 2 159 027 | * | 11/1985 | 219/726 |
| GB | 2 300 095 | * | 10/1996 | |
| GB | 2 370 240 | * | 6/2002 | |

* cited by examiner

*Primary Examiner*—Philip H. Leung
(74) *Attorney, Agent, or Firm*—Jackson Walker, LLP

(57) ABSTRACT

A stirring device for use in combination with a microwave oven and a carousel device either integral or portable having a base member with an integral attachment device for attachment to said microwave. A shaft depends from the base member, terminating in a blade member.

12 Claims, 7 Drawing Sheets

64
66
68
69
70A
70B
70C
70D
71A
71B
71C
71D
72A
72B
73A
73B
73C
73D
81
2.50
5.00
1.00
0.50 4PL
Ø0.375 ±0.005

MICROWAVE OVEN WITH FOOD STIRRING DEVICE

This application claims priority from U.S. Pat. No. 60/452,195 filed Mar. 5, 2003.

FIELD OF THE INVENTION

This invention relates to kitchen devices. More particularly, the present invention relates to a stirring device to be used in a microwave oven.

BACKGROUND OF THE INVENTION

In these modern times, people seem to be in a greater rush, desiring a quicker method of performing everyday chores such as cooking. The introduction of the microwave oven greatly reduced the time required to cook meals, because they are simple to use and heat food more rapidly than conventional cooking methods such as ovens or stoves. While microwaves heat food much quicker and more efficiently than conventional devices, they still have problems which reduce efficiency. There are many devices being developed which attempt to solve these problems.

When a microwave oven is used, food materials do not tend to be heated in a uniform manner, requiring the food to be turned or stirred at regular intervals. This necessitates continual monitoring by the food preparer who must discontinue cooking while turning or stirring the food. Discontinuing the use of the microwave while turning the food results in the cooking time being increased and cooling of the food being prepared. This problem has been solved by the introduction of a carousel (turntable) device. A carousel is a revolving plate placed in or built into the bottom of the microwave oven. When food is placed on the carousel, it will be continually turned in the microwave, removing some of the necessity of continuous monitoring. It also decreases the amount of time required to heat the food material since the microwave is continuously operating.

The cooking of many food materials is also enhanced and evenly heating by stirring, with some food materials requiring it. Periodically stirring food material, even those that do not necessarily require it, promotes uniform heating, and increases the quality of the prepared food. While stirring the food material reduces the cooking time as opposed to not stirring the food material, the cooking time is still increased due to the periodic removal of the food material from the microwave. The food preparer must remove the food material, contained in a bowl or other container, from the microwave and thoroughly mix it using a spoon or other mixing device. The food material is then replaced in the microwave oven and the cooking is continued. This step increases cooking time as well as being inconvenient for the food preparer since continuous monitoring is necessary. The cooking time can be somewhat reduced by using the turntable device to continuously turn the food while cooking. However, this will not remove the need for discontinuation of the cooking while the food material is stirred.

It would be highly advantageous, therefore, to remedy the foregoing and other deficiencies inherent in the prior art.

Accordingly, it is an object of the present invention to provide a device for use in combination with a microwave oven.

Another object of the present invention is to provide a device for use with a microwave oven which will reduce the amount of time required to cook food material.

And another object of the present invention is to provide a device for use with a microwave oven to increase the uniform heating of food material.

Still another object of the present invention is to provide a device for use with a microwave oven which will stir food material while the microwave is in operation.

Yet another object of the present invention is to provide a device for use with a microwave oven which will reduce the monitoring time necessary for the food preparer.

A further object of the present invention is to provide a stirring device which would be used in combination with a microwave oven and a carousel or turntable device whether fixed or portable.

And a further object of the present invention is to provide a device for use with a microwave oven which would increase its convenience and efficiency.

Yet a further object of the present invention is to provide a stirrer for use in a microwave oven which is relatively simple to use and easy to install, without the use of tools and without alteration of the microwave oven interior.

And yet a further object of the present invention is to provide a stirring device for use in a microwave oven which is relatively inexpensive.

SUMMARY OF THE INVENTION

Briefly, to achieve the desired objects of the invention in accordance with the preferred embodiment thereof, provided is a base, incorporating an attachment member which engages the upper surface of the cooking compartment of a microwave oven. A shaft depends from a base member, and terminates in a stirring member, such as a head comprising a blade or multiple blades.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which.

DETAILED DESCRIPTION OF THE PREFERRED EMBODIMENT

Figure 1:
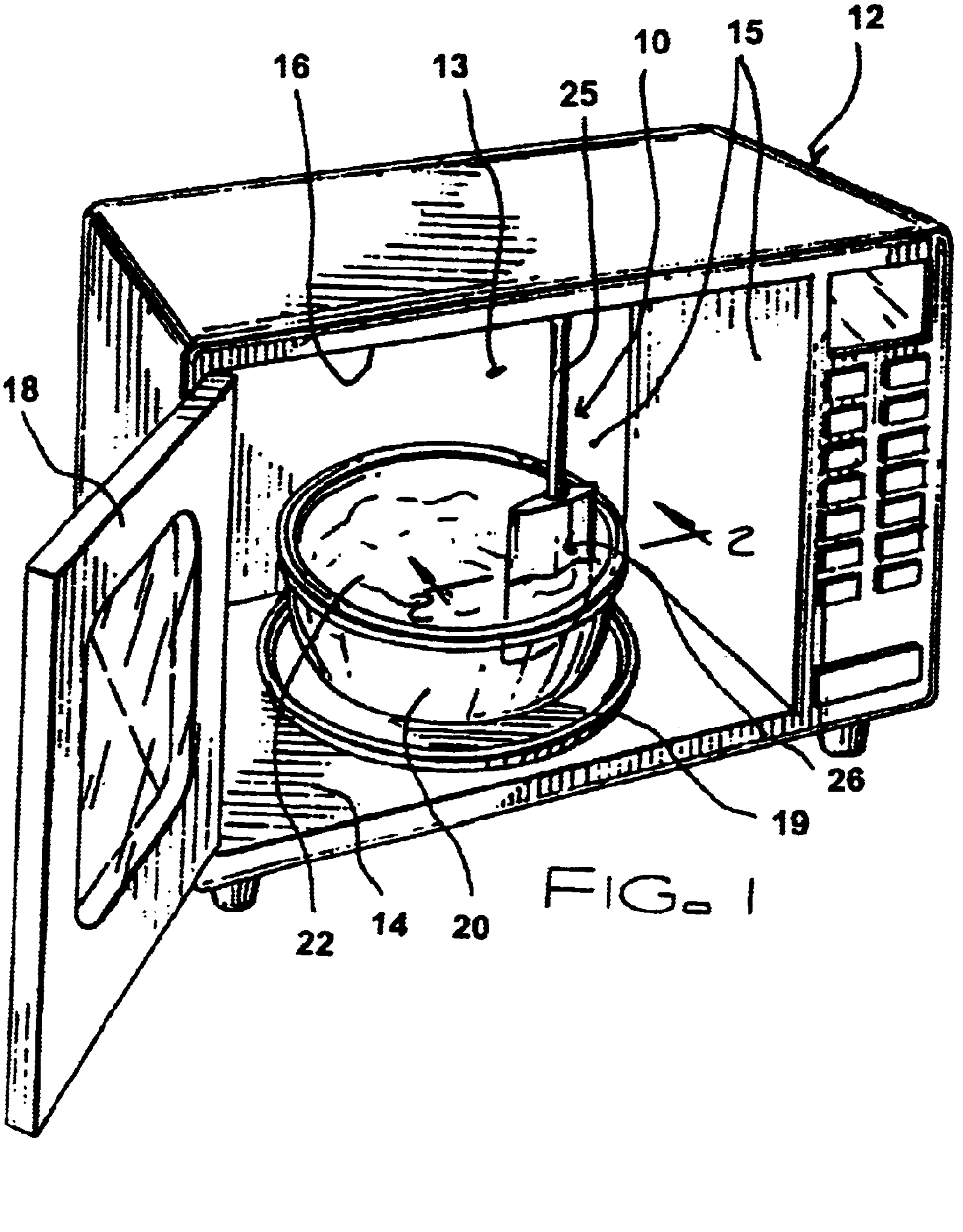
FIG. 1 is a perspective view of a stirring device, constructed in accordance with the teachings of the instant invention, as it would appear installed and in use in a conventional microwave oven.

Turning now to the drawings in which like reference characters indicate corresponding elements throughout the several views, attention is first directed to FIG. 1 which illustrates a stirring device generally designated (10), installed on a microwave oven (12). Microwave oven (12) may be any microwave oven having a cooking chamber (13) defined by a floor (14), walls (15), an upper surface (16), and sealed by a door (18). Stirring device (10) is used in microwave oven 12 in combination with a carousel device (19). Carousel device (19) may be any of a number of different devices for continuously turning a container (20) while microwave oven (12) is in operation. In this preferred embodiment, container (20) is a conventional bowl containing food material (22). Container (20) is placed on carousel device (19) so that it will be continuously turned while microwave oven (12) is in operation. Stirring device (10) is coupled to upper surface (16) of cooking chamber (13), and extends downward towards floor (14). When properly installed, stirring device (10) extends downward from upper surface (16) so that it extends into container (20).

Figure 2:
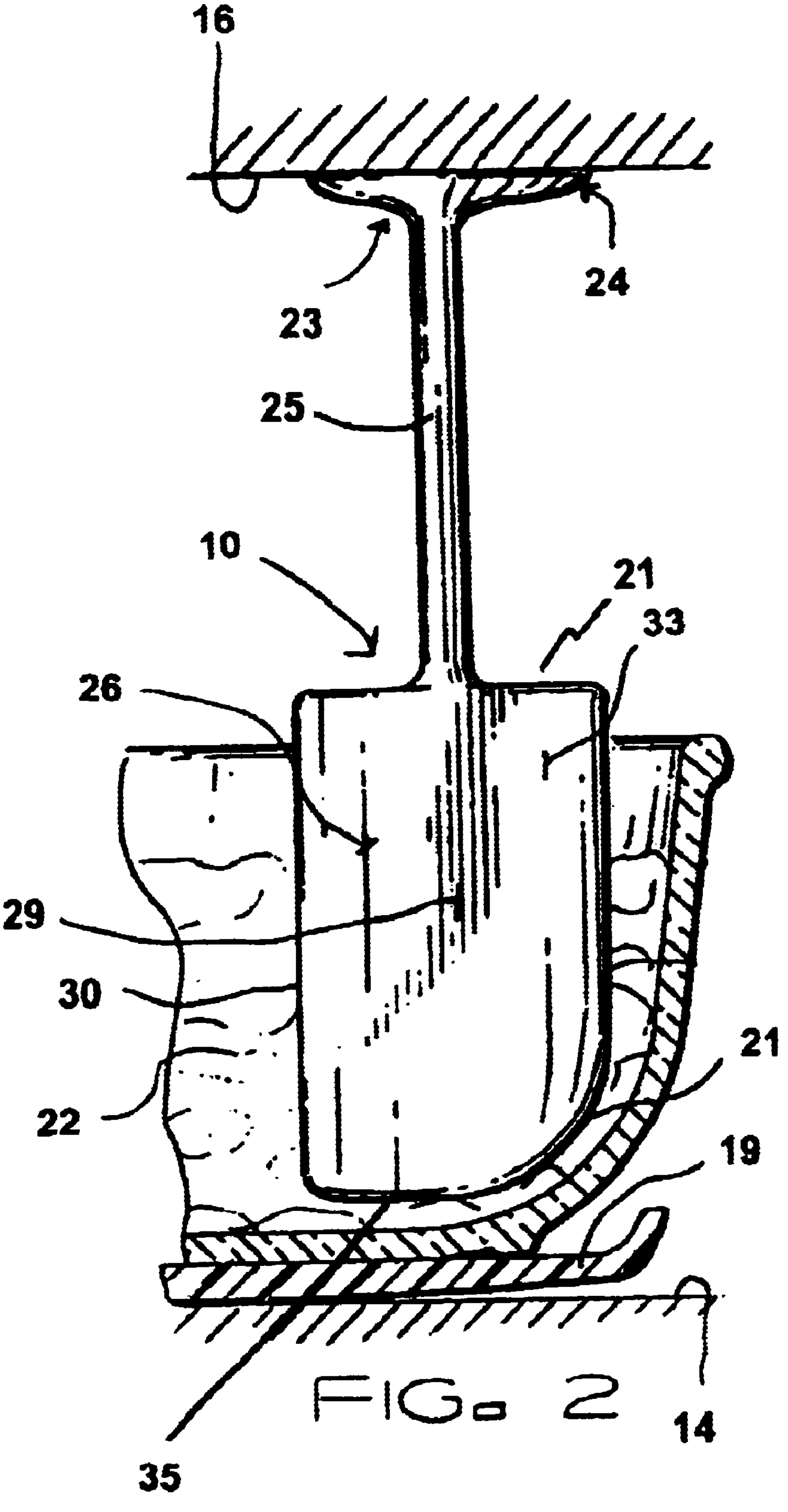
FIG. 2 is a side view of the present invention taken along line 2 of FIG. 1.
Figure 3:
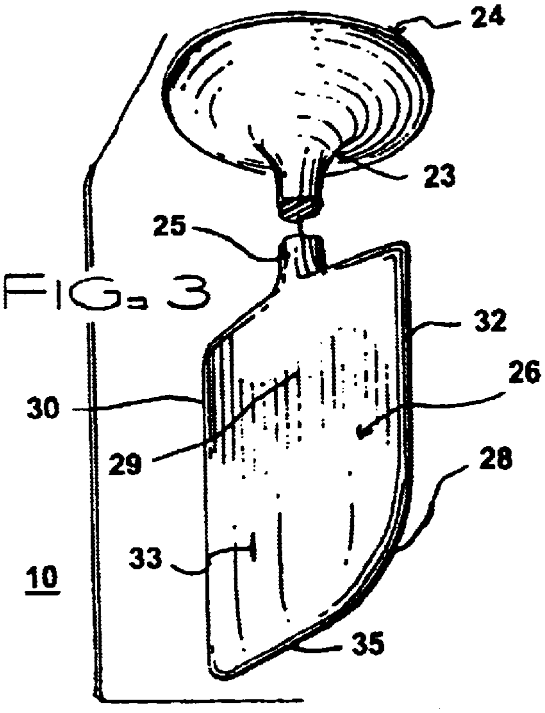
FIG. 3 is a perspective view of the present invention.
Figure 4:
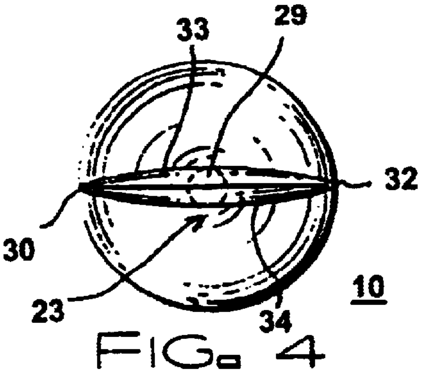
FIG. 4 is an end view of the present invention.

Referring now to FIG. 2, stirring device (10) consists of a base member (23) incorporating an attachment member (24). In this embodiment, attachment member (24) is a conventional suction cup which is fixed to upper surface (16) of cooking chamber (13). Attachment member (24) will be discussed in greater detail below. A shaft (25) depends downward from base member (23), and terminates in a head (21), here including a blade member (26). In this embodiment, blade member (26) is a substantially rectangular shape having at least one rounded corner (28) at an end distal from base member (23). As can be seen in FIG. 4, blade member (26) may have a thickened medial portion (29) extending along its length on a longitudinal axis extending from base member (23). Blade member (26) narrows to edges (30) and (32) to either side of thickened medial portion (29), forming generally arcuate surfaces (33) and (34). Blade member (26) narrows to a third edge (35) distal to base member (23) and incorporating rounded corner (28).

Referring back to FIG. 2, it can be seen that attachment member (24) is fixed to upper surface (16) of microwave oven (12) typically slightly off center from carousel device (19). When container (20) is placed on carousel device (19), head (21) comprising single blade member (26) of stirring device (10) extends into container (20) off center, near one side. Shaft (25) and blade member (26) are of a length sufficient to bring third edge (35) near carousel device (19) while still permitting the bottom of container (20) to fit between carousel device (19) and third edge (35).

Stirring device (10) is installed so as to place rounded corner (28) near the side of container (20). This permits blade member (26) to be placed near the rounded sides of container (20). The off center placement of stirring device (10) permits blade member (26) to continuously stir the contents of container (20) as it is turned by carousel device (19). This removes the need to discontinue cooking while food material (22) is stirred.

In this embodiment, stirring device (10) is constructed of a single piece, preferably using a plastic material which will withstand temperatures of 275 degrees Fahrenheit for thirty minutes. Shaft (25) and blade member (26) of stirring device (10) are slightly flexible, enhancing its stirring action by allowing food material (22) to pass more easily. It will be understood by those skilled in the art that stiffer materials and materials which will withstand greater temperatures may be used.

Figure 5:
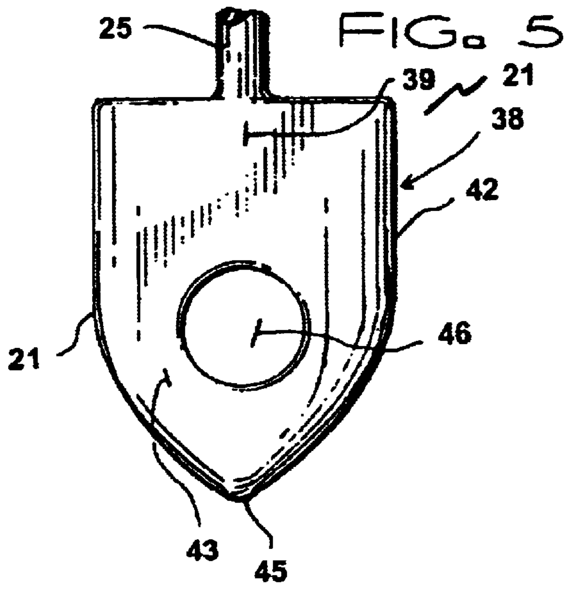
FIG. 5 is a partial view of the present invention illustrating an alternate embodiment of the blade member.
Figure 6:
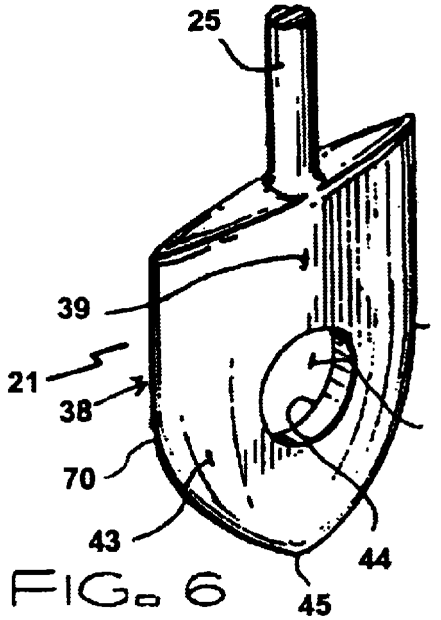
FIG. 6 is a perspective view of the alternate blade member illustrated in FIG. 5.

Referring to FIG. 5, an alternate blade member (38) is illustrated. Alternate blade member (38) has a thickened medial portion (39) extending its length on an axis with a shaft (25). Alternate blade member (38) narrows to edges (40) and (42) on either side of thickened medial portion (39), and join to form a point (45) at the end of alternate blade member (38) distal from base member (23). An opening (46) is formed in alternate blade member (38) through thickened medial portion (39) above point (45). Opening (46) improves stirring efficiency by allowing food material (22) to pass through opening (46). This allows for easier passage of alternate blade member (38) through food material (22) and improves stirring efficiency.

Figure 7:
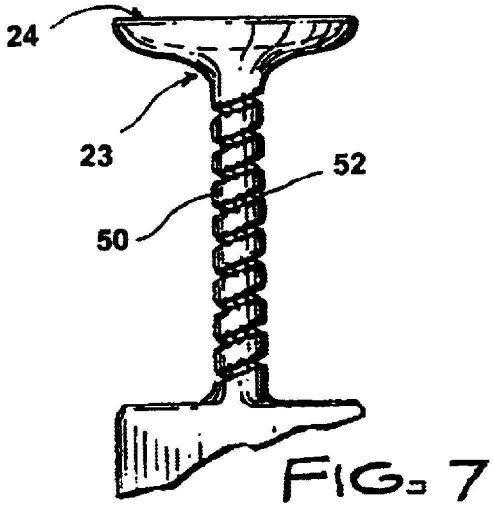
FIG. 7 is a partial side view of the present invention illustrating an alternate embodiment of the shaft member.
Figures 9A, 9B, 9C, 9D:
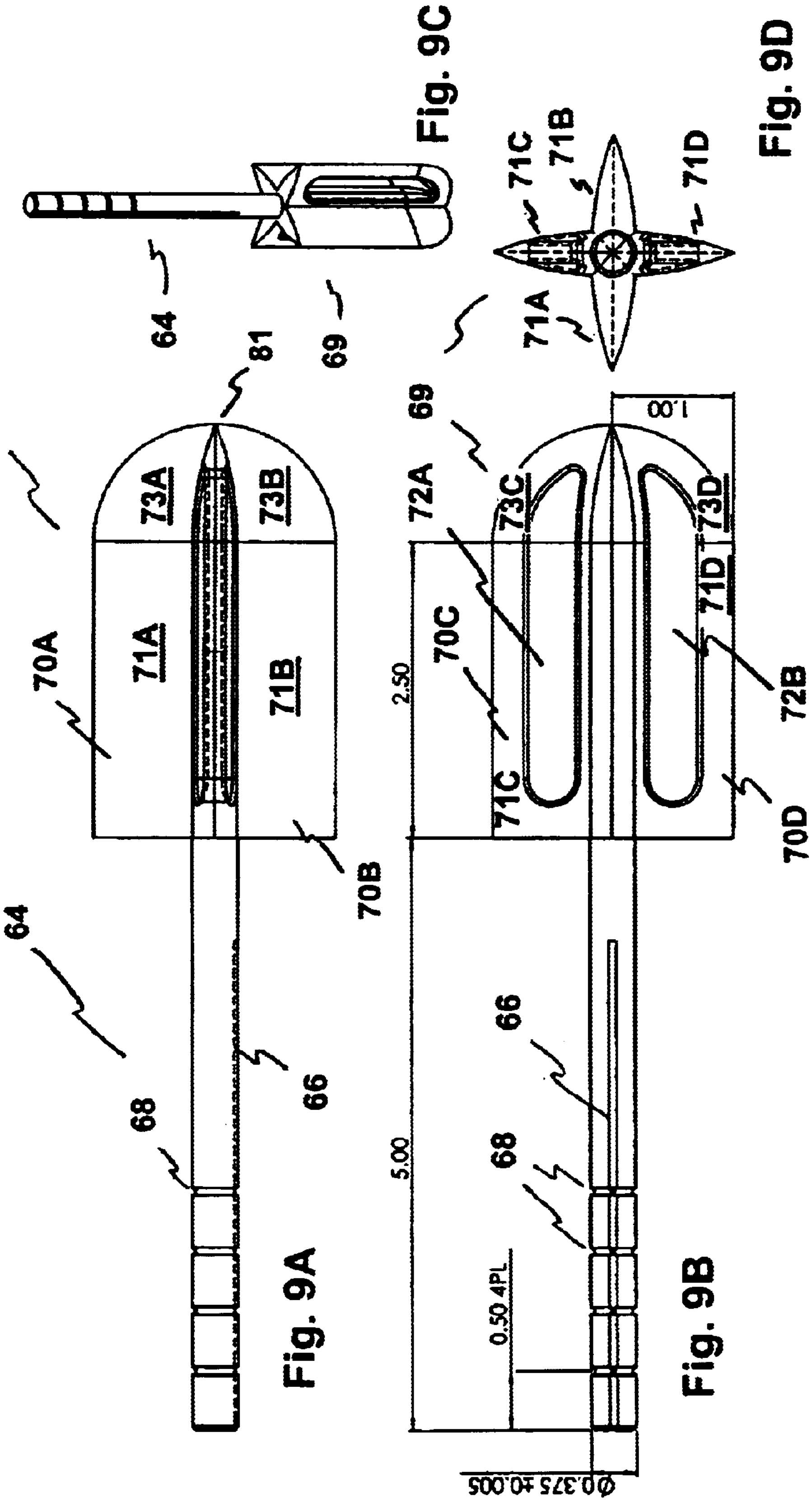
FIGS. 9A–9D illustrate an alternate preferred embodiment of the present invention having a head with multiple blades.
Figure 10C:
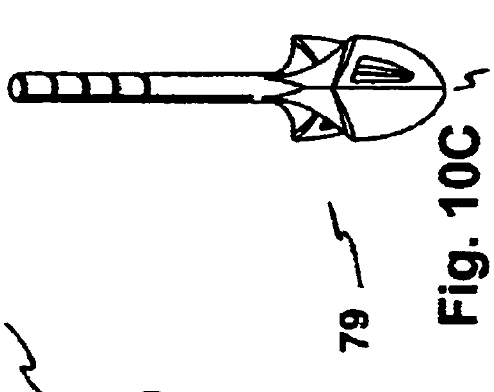
FIGS. 10A–10D illustrate yet another alternate preferred embodiment of the present invention having a head with multiple blades.
Figure 10D:
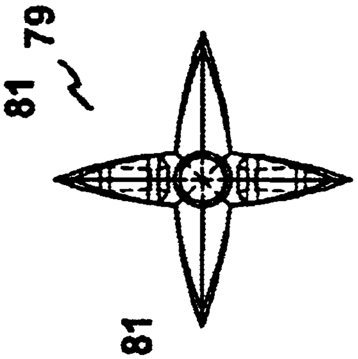
Figure 10A:
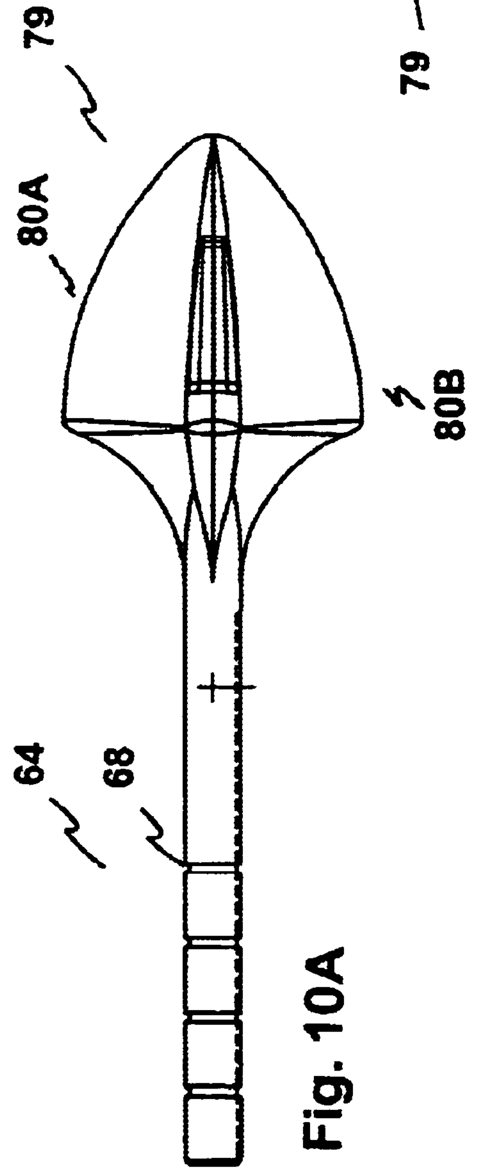
Figure 10B:
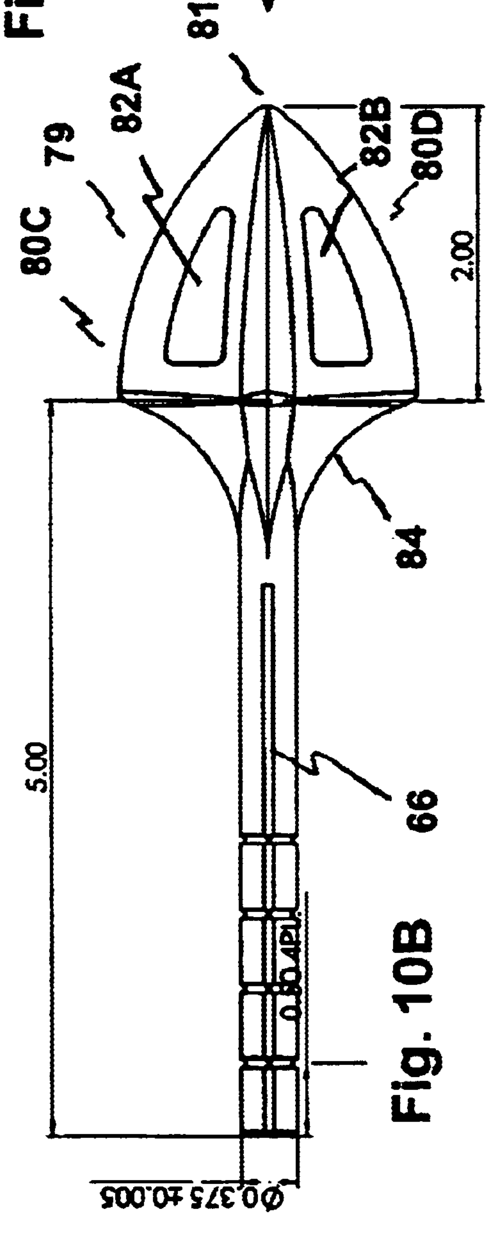

Referring to FIG. 7, an alternate shaft (50) is illustrated. Alternate shaft (50) depends from base member (23) and terminates in blade member (26) or alternate blade member (38). The flexibility of alternate shaft (50) is enhanced by a spiral groove (52) formed in alternate shaft (50). Groove (52) extends from base member (23, spiraling along the length of shaft (50) to blade member (26). The introduction of groove (52) in shaft (50) allows a stiffer material to be used for stirring device (10). This results in decreased flexibility in blade member (38), while groove (52) increases flexibility in shaft (50).

Figure 8:
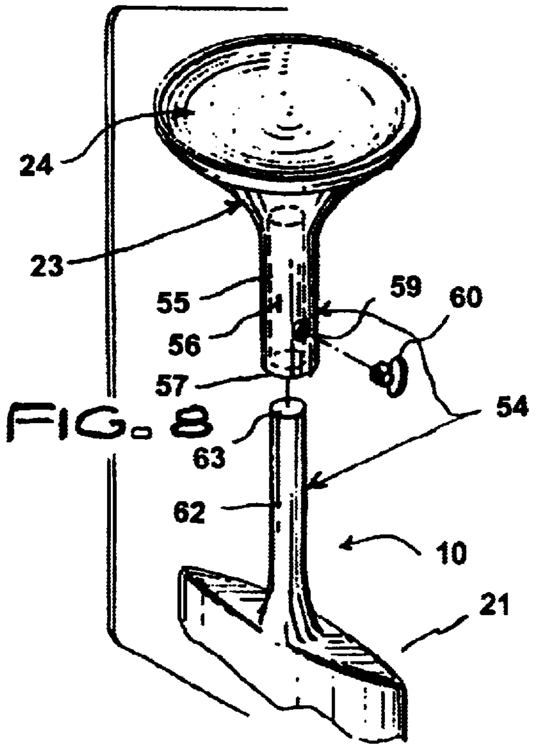
FIG. 8 is a partial perspective view of the present invention illustrating another embodiment of the shaft.

Referring now to FIG. 8, another alternate shaft (54) is illustrated. Alternate shaft (54) consists of two telescoping segments. A first segment (55) depends from base member (23), and contains a shaft opening (56) extending its length and opening at an end (57) distal from base member (23). A screw opening (59) extends through first segment (55), joining shaft opening (56), proximate distal end (57) of first segment (55). Screw opening (59) is configured to receive a locking screw (60). A second segment (62) has a first end configured to be received by shaft opening (56). Second segment (62) terminates in head (21), opposite first end (63). First end (63) of second segment (62) is received by shaft opening (56), and can be inserted to a variety of depths. When the desired length of shaft (54) is obtained, locking screw (60) is tightened in screw opening (59), acting as a securing member, securing second segment (62) in place. This allows the length of shaft (54) to be varied with the size of microwave oven (12) or the height of container (20).

FIGS. 9A through 9D illustrate an alternate shaft (64). Alternate shaft (64) is seen to have a longitudinal groove (66) in the surface thereof, the longitudinal groove starting at or near a first end of the shaft and extending at least partially down the shaft towards alternate head member (69). The purpose of the longitudinal groove is to relieve any air pressure that might be captured in the process of extending alternate shaft (64) into an attachment device, for example air or steam being trapped between the tight fitting attachment device (see FIGS. 11A–11B) and alternate shaft. Expanding heated gas trapped in an attachment member between the walls of the attachment member and alternate shaft (64) may escape down longitudinal groove (66).

Also illustrated in FIGS. 9A through 9D are a shaft with a multiplicity of circumferential grooves (68). The function of circumferential grooves (68) is to provide convenient points at which to cut the length of alternate shaft (64) to make it shorter so as to fit in smaller microwave ovens. For example, total length of stirring device (10) is typically in the range of 7"–11". This range will accommodate most microwave ovens. Thus, the length of the stirring device typically provides about 11". However, for the smaller microwave ovens where the upper surface is closer to the floor, providing circumferential grooves (68) will allow one to shorten the shaft by using a knife or other cutting instruments at the circumferential groove to shorten the shaft to about 7" minimum, so as to accommodate the shallower cooking chamber.

One can readily appreciate with reference to FIGS. 9A through 9D that alternate head member (69) is providing having a different geometry than the previous embodiments. More particularly, the embodiment set forth in FIGS. 9A through 9D illustrate a multiplicity of blade members here, blade members (70A) through (70D), radially extending from an extension of the longitudinal axis of the shaft. Blade members (70A) through (70D) are seen to include blade body (71A) through (71D), here the blade bodies being generally rectangular in side view. The blades (70A) through (70D) also are comprised of blade noses (73A) through (73D), blade noses here defining, in side view, a constant radius of curvature from the more tabular blade bodies.

Some of blades (70A) through (70D) may include blade openings. Here, blade openings (72A) and (72B) are contained within blades (70C) and (70D) and are opposed to one another. That is, the arrangement of blade openings (72A) and (72B) is such that a solid (non-opened) blade, here blades (70A) and (70B) are interposed between the open blades. Applicants have found the use of multi-bladed heads, and especially heads with alternating solid and open blades being particularly advantageous to effective mixing and stirring.

FIGS. 10A through 10D illustrate another alternate preferred embodiment (79) of a head member. This embodiment, as in the embodiment set forth with respect to FIGS. 9A through 9D, shows a multiplicity of blades, here blade members (80A) through (80D). The multiplicity of blades are, in this preferred embodiment, comprised of opposed members set forth 180° with respect to the other. For example, here paired blade members (80A) and (80B) are comprised of solid bodies with arcurate edges defining a spade in the side view. Opposed blades (80C) and (80D) are seen to have blade openings (82A) and (82B) and again have a spade shaped side view. All four blade members in both embodiments have head members (69) and (79) are rounded to join at a common nose tip (81). Note however, in FIGS. 10A and 10B, wings (84) are provided extending between the shaft and the blade members, providing some additional rigidity to the blades. Wings (84) may be provided with any head embodiment set forth herein.

Figure 11A:
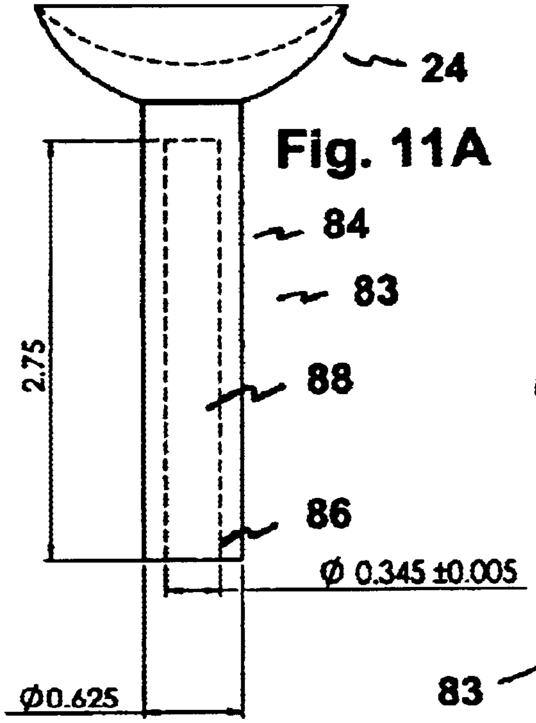
FIGS. 11A–11B illustrate side and perspective views of an attachment member for use in Applicant's present invention.
Figure 11B:
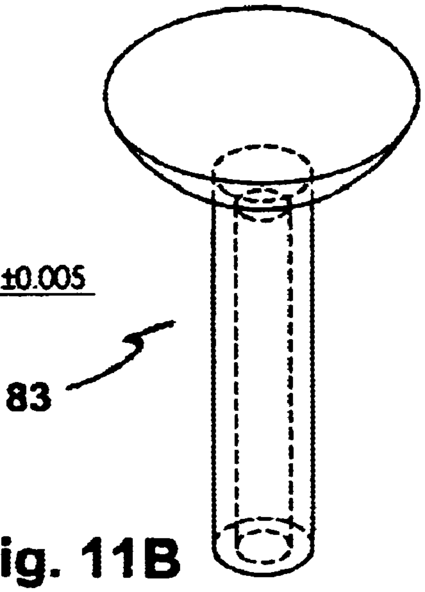

FIGS. 11A and 11B present two views in an alternate attachment member (83) having a suction cup (24) with a shaft (84) attached thereto which shaft has an open end (86), the open end defining a cylindrical cavity (88) that is dimensioned to receive alternate shaft (64) snugly therein. This embodiment is similar to element 55 in FIG. 8, but is without the screw and screw hole. However, making the alternate attachment member (84) out of a pliable somewhat stretchable material (such as silicone) will allow a stretch snug interference fit of shaft (84) over the slightly larger alternate shaft (64). For example, the inner diameter of cavity (88) may be 0.345" and the outer diameter of the alternate shaft (64) may be 0.375".

Multi-bladed heads may have any number, odd or even, of blade members, some, all or none of which may have openings therein.

Those skilled in the art will understand that any of the alternate embodiments of the shaft member may be combined with any of the blade member embodiments, depending on the desired results.

For example, while the invention has been specifically described as including a blade, other stirring members such as knives or whisks are anticipated. Similarly, the device may be fabricated of various materials.

While the stirrer is typically placed off center with respect to the bowl it does not have to be off center and may be in the center. Further, the use of two or more stirrers in a single bowl is possible. If two stirrers are used they are typically placed 180 degrees with respect to a central axis going through the turntable.

It has been found that approximately 60–80 durometer material works effectively. Durometer is a measure of surface recessively. One effective material that has been found to work well is Evoprene® a thermal plastic elastomer. Evoprene® is a available from Evode Ltd., Stafford, England. Evoprene® does not have an adverse reaction with oils, fats, water, etc., that may be found in food material. It may come in clear, white, red, blue, green, brown, yellow, orange, black and other colors.

Applicant's novel stirrer is also available in a kit which will include a bowl. The bowl will typically have a curvature that will match the curvature of the blade.

For cooking with Applicant's novel mixture a heavy, microwave bowl is typically used. The food product is either prepared in the bowl or prepared and placed in the bowl. The microwave mixer is then placed into the mixing bowl containing the food product. The bowl is then placed on the microwave oven turntable.

The inside top of the microwave should be clean and dry, positioning the mixer suction cup close to the middle of the microwave oven cavity attach the suction cup onto the top of the microwave oven cavity.

Close the microwave door. Select cooking time and temperature setting and start the microwave oven. As the turntable revolves the mixer and the bowl will adjust while the food product is stirring. When the cooking time is complete open the microwave door, unsuction the suction cup from the ceiling of the microwave cavity. Remove the bowl and micromixer at the same time.

Applicant's mixer is designed to allow the user to adjust the length by simply inserting a shaft into the suction cup base and stopping at the ideal length of the cavity of the microwave oven. The ideal length occurs when the mixer is attached securely to the top of the microwave oven cavity by the suction cup attachment device and the bottom of the mixing blade almost touches the bottom of the bowl. The shaft does not need to be pushed all the way into the suction, however it does need to be inserted at least one inch into the suction cup. If the shaft requires shortening to fit into a microwave oven, trimming can be done by cutting the shaft at the grooves.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A stirring device for use in combination with a carousel in a microwave oven comprising:

a base member adapted to fit against an upper surface of a cooking chamber of the microwave oven;

an attachment member integral to said base member wherein said attachment member is a single suction cup; and a shaft depending vertically from said base member, wherein said shaft further comprises a first segment having a shaft opening and a second segment for telescopic fit with the shaft opening of the first segment wherein the second segment includes a longitudinal groove and terminates in a head member.

2. A device claimed in claim 1 further comprising:

a securing member for securing said second segment to said first segment.

3. A device as claimed in claim 2 wherein said securing member comprises:

a screw hole extending through said first segment and joining said shaft opening proximate said distal end; and a locking screw received by said screw hole.

4. A device as claimed in claim 1 wherein said second segment of said shaft further includes a groove extending in a spiral along at least part of the length of said second segment.

5. A device as claimed in claim 1 wherein said head member includes a blade having an opening extending there through.

6. A device as claimed in claim 1 wherein the head member comprises a multiplicity of blades.

7. A device as claimed in claim 6 wherein some of said multiplicity of blades have openings in the walls thereof and others of said multiplicity of blades do not.

8. A device as claimed in claim 1 further including circumferential grooves in the walls of the second segment of the shaft.

9. A stirring device comprising:

a microwave oven having:

a cooking chamber defined by three walls, a floor, an upper surface, and a door, and a carousel located on said floor of said microwave oven, a base member;

an attachment member comprising a suction cup integral to said base member and fixed to said upper surface of said cooking chamber; and a shaft depending from said base member, wherein said shaft further comprises:

a first segment depending from said base member and having an end distal to said base member;

a shaft opening extending along the axis of said first segment and opening at said distal end;

a second segment having a first end configured to be telescopically received by said shaft opening and a second end terminating in a head having at least one blade, the second segment having circumferential grooves.

10. A device as claimed in claim 9 wherein said at least one blade has an opening extending there through.

11. A device as claimed in claim 9 wherein said head has a multiplicity of blades, at least some of said multiplicity of blades having holes therein.

12. A device as claimed in claim 11 wherein at least some of the blades have a curved edge.

* * * * *